March 14, 1950     E. H. YONKERS     2,500,730
ALTERNATING CURRENT GENERATOR Filed Sept. 11, 1944     3 Sheets-Sheet 1

INVENTOR.
Edward H. Yonkers,
BY Mueller, Dodds & Mason
Attys.

Patented Mar. 14, 1950

2,500,730

UNITED STATES PATENT OFFICE 2,500,730

ALTERNATING CURRENT GENERATOR

Edward H. Yonkers, Chicago, Ill.

Application September 11, 1944, Serial No. 553,513

17 Claims. (Cl. 171—252)

The present invention relates to alternating current generators and more particularly to improvements in electromechanical generators of the inductor type.

It is an object of the present invention to provide an improved alternating current induction generator which is light in weight, efficient in operation, and yet is of simple, rugged and economical construction.

It is another object of the invention to provide an improved generator of the character described which is capable of producing a high frequency alternating current when operated at relatively low rotor speeds.

According to another object of the invention, the generator rotor speed required to produce a given frequency output with a generator of given size and weight is minimized by providing improved facilities for alternately directing the field flux through different sectors of the rotor and stator structures.

According to a further object of the invention, the size and weight of a generator of given output are further minimized by arranging the inductor or pickup winding on the periphery of the rotor structure.

In accordance with still another object of the invention, a high output frequency is obtained at a low rotor speed with a rotor structure of small diameter by providing the rotor and stator structures with small teeth having the function of shifting the predominant portion of the field flux back and forth between different sectors of the relatively rotating structures at a rate of one complete flux shift for relative rotation between the two structures equal to the width of one tooth.

According to a still further object of the invention, the voltage developed for a generator of given size and having a given number of turns in its pickup or inductor winding is enhanced by so arranging the rotor and stator structures that the predominant portion of the field flux cuts all of the active turn segments of the winding twice during each flux shift.

It is a further object of the invention to provide an improved arrangement for variably changing the phase relationship between the voltage components produced in the active coil turn segments by the two halves of the field flux.

In accordance with yet another object of the invention, improved facilities are provided for automatically effecting the described phase shift in the correct sense to maintain substantially constant the output voltage across the winding terminals under different generator load conditions.

It is still a further object of the invention to provide an improved generator of the character described, the rotor and stator structures of which are so arranged that the flux paths therethrough are of substantially constant reluctance at all relative angular positions of the two structures, whereby hysteresis losses in the two structures and distortion of the generator output voltage from a desired wave form are minimized.

The invention, both as to its organization and method of operation, together with further objects and advantages thereof, will best be understood by reference to the following specification taken in connection with the accompanying drawings in which.

Referring now to the drawings, the present improved alternating current generator is there illustrated as comprising relatively rotatable rotor and stator structures 11 and 10 respectively, which are supported for relative rotation by means of housing plates 13 and 14 disposed at the front and back sides of the stator structure. The rotor structure is comprised of a centrally disposed permanent magnet 22 of cylindrical form, and end plates 20 and 21 which are respectively provided with integrally formed shaft portions 20a and 21a. These shafts are journaled within ball bearings 18 and 19 which are fixedly mounted within suitable centrally disposed apertures provided in the housing plates 13 and 14. Thrust washers 20b and 21b are provided between the end plates 20 and 21 and their respective associated ball bearings 18 and 19 to prevent relative axial movement of the rotor and stator structures. Relative rotary movement may be imparted to the stator and rotor structures by a suitable drive mechanism which is connected to the projecting end of the shaft portion 21a to drive the rotor structure 11.

Figure 1:
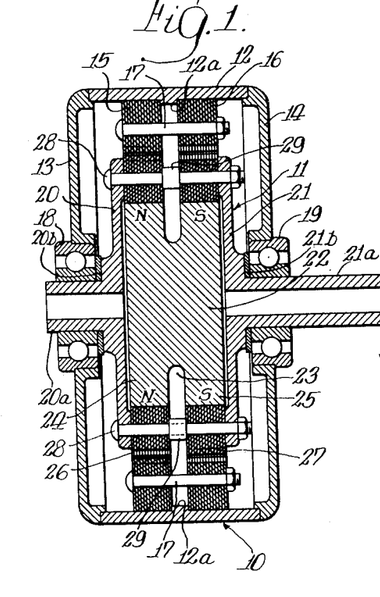
Fig. 1 is a side sectional view illustrating an improved alternating current inductor generator characterized by the features of the present invention.
Figure 2:
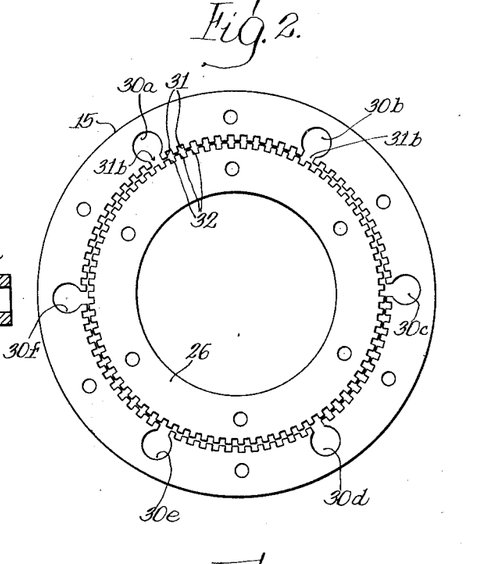
Fig. 2 is a front view in perspective of certain of the rotor and stator parts embodied in the generator shown in Fig. 1.

The rotor structure further comprises two annular rings 26 and 27, which are constructed of magnetic laminations stacked axially of the stucture and are of a diameter to form a press fit with the ground peripheral surface of the permanent magnet 22. Non-magnetic clamping bolts 28 spaced apart around the periphery of the end plates 20 and 21 and extending through registering openings in these plates, and the rings 26 and 27, are used to maintain assembled the named parts of the rotor structure. Non-magnetic spacing sleeves 29 telescoped over the assembly bolts 28 are utilized to maintain the rings 26 and 27 in spaced apart positions axially of the rotor structure. As best shown in Fig. 1 of the drawings, the permanent magnet 22 is provided with a radially disposed slot 23 which is centrally disposed axially of the rotor structure and is in radial alignment with the space between the two rings 26 and 27. The purpose of this slot is to divide the outer part of the magnet 22 into two axially displaced annular sections 24 and 25, and the magnet is so magnetized that the ring like portion 24 disposed upon one side of the slot comprises a north magnetic pole and the ring like portion 25 disposed upon the opposite side of the slot constitutes a south magnetic pole. Preferably the magnet 22 is formed of Alnico or another like magnetizable material having high coercive force and otherwise suitable for use as a magnetic field source. A soft iron core having a winding disposed within the slot 23 and its terminals brought out to a direct current source through slip rings may be used instead of the illustrated permanent magnet if desired.

Briefly considered, the stator structure 10 comprises an outer cylindrical magnetic shell 12 and two annular rings 15 and 16 each comprised of a plurality of magnetic laminations held in stacked relationship by means of assembly bolts 17 extending therethrough at circumferentially spaced apart points therearound. These rings are in radial alignment with the rings 26 and 27 of the rotor structure, and preferably are press fitted within the inner surface of the shell 12. They may be keyed to this shell to prevent relative angular movement therebetween and are held in axially spaced apart positions by means of an inner annular rib 12a formed integral with the shell 12 and axially aligned with the slot 23 provided in the permanent magnet 22. At its edges, the shell 12 is seated upon shouldered portions of the two housing plates 13 and 14, assembly screws threaded into the edges of this shell through openings provided at the peripheries of the plates 13 and 14 being utilized to maintain the rotor and stator structures of the generator fully assembled.

Figures 5, 6:
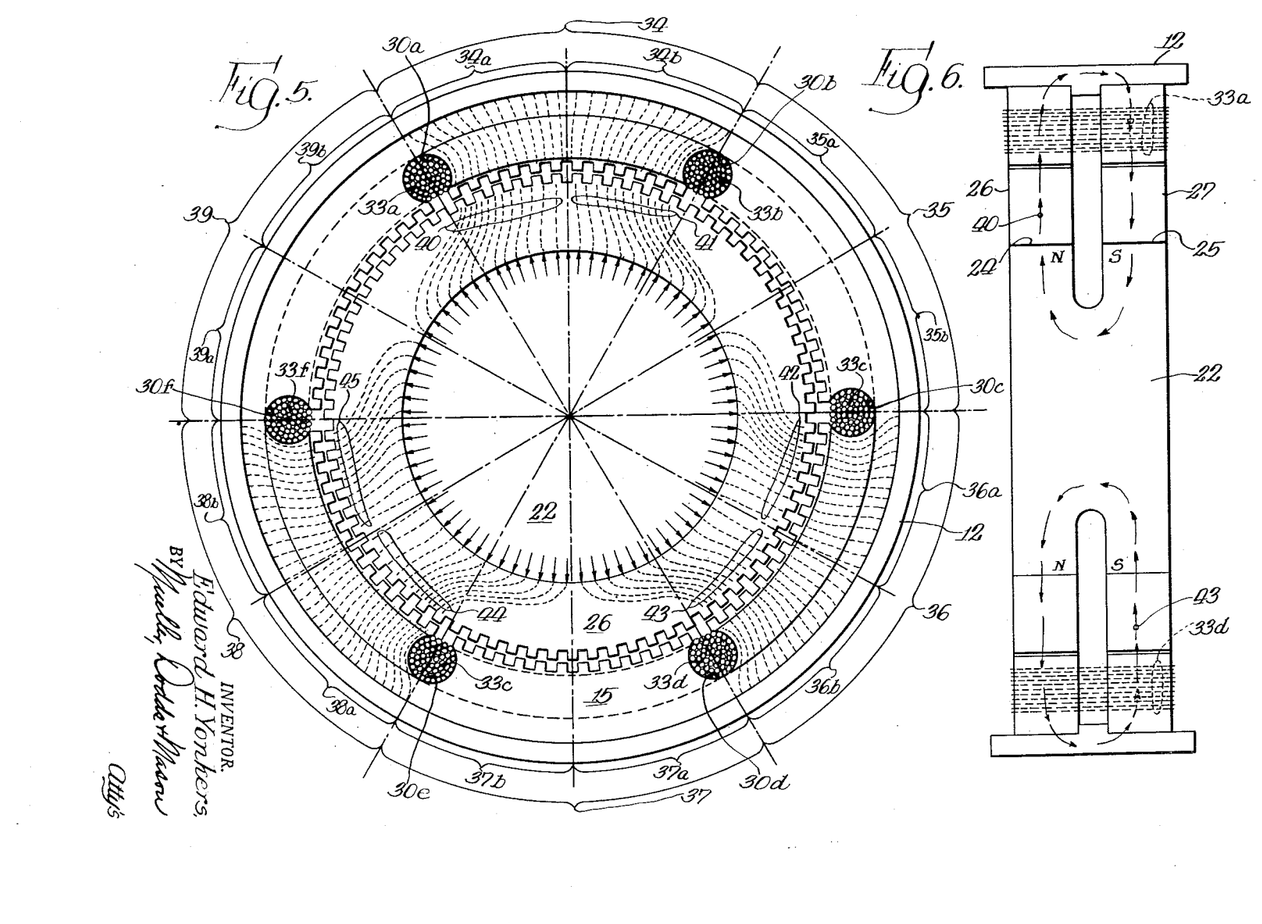
Fig. 5 is an enlarged front view of the rotor and stator elements illustrating the flux distribution therein when these elements occupy predetermined relative positions.
Fig. 6 is a schematic sectional view of the rotor and stator elements illustrating certain of the flux paths therethrough.
Figure 7:
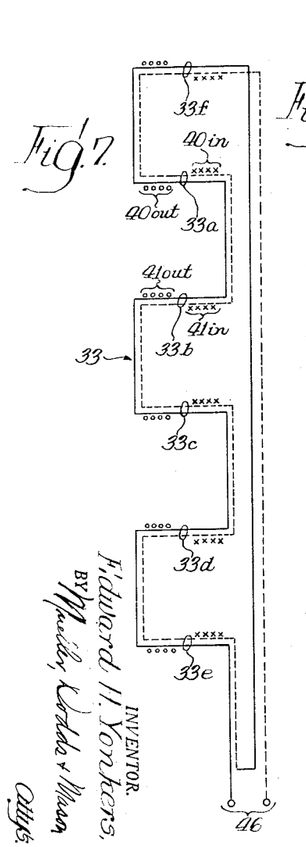
Fig. 7 schematically illustrates in developed form the inductor or pickup winding embodied in the generator.

With the above described arrangement of the rotor and stator structures, it will be fully apparent that a magnetic circuit is provided which causes the flux developed by the permanent magnet 22 to traverse a path which extends from the north pole 24 through the rotor ring 26, the air gap between the rings 26 and 15, the stator ring 15, the shell 12, the stator ring 16, the air gap between the rings 16 and 27 and the rotor ring 27 at all points around the outer periphery of the rotor structure. In this regard it is noted that the housing plates 13 and 14 are formed of a non-magnetic material, such for example, as aluminum, in order to eliminate flux paths other than that specifically described. The outer peripheries of the rotor rings 26 and 27 are radially displaced from the inner peripheries of the stator rings 15 and 16 by very small air gaps of the order of .002" in order to provide a magnetic circuit of minimum reluctance. In the embodiment of the invention illustrated in Figs. 1 through 7 of the drawings, the inductor or pickup winding is carried by the stator structure. More specifically and as best illustrated in Figs. 5, 6 and 7 of the drawings, this winding, indicated generally at 33, is comprised of active turn segments 33a, 33b, 33c, 33d, 33e and 33f which extend through coil slot openings 30a, 30b, 30c, 30d, 30e and 30f respectively disposed at equally spaced points around the inner portion of the stator rings 15 and 16. More specifically, each turn of this winding is threaded in and out through the described coil slot openings. Thus to consider a single turn, the first active segment thereof may be threaded through the slot 30a from the front side of the rotor structure as seen in Fig. 5 of the drawings, passed over to the slot 30b at the back side of the stator structure, brought out through the slot 30b and passed over to the slot 30c at the front side of the rotor structure. This in and out winding may be continued to produce as many winding turns as may be required to deliver the desired output voltage. It will thus be seen that the active turn segments of the winding are, in the illustrated embodiment of the invention, displaced by 60 degrees around the peripheries of the rotor and stator structures and that these active turn segments serve to divide the two structures into six equal sectors or sextants 34, 35, 36, 37, 38 and 39 of equal size.

Figures 3, 4:
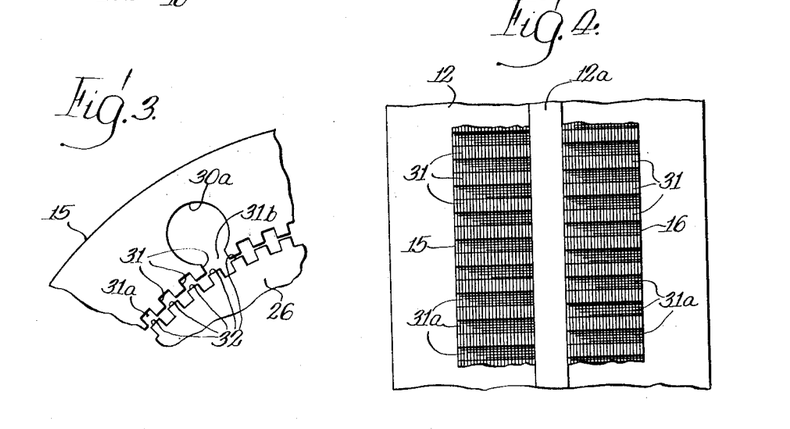
Fig. 3 is a fragmentary detail view illustrating enlarged segments of the two parts shown in Fig. 2.
Fig. 4 is an inner peripheral view of the toothed stator rings embodied in the generator, illustrating the tooth displacement between the teeth of the two rings.

For the purpose of shifting different portions of the flux produced by the permanent magnet 22 back and forth between adjacent sectors of the two structures, thereby to cause this flux to cut the active turn segments of the winding 33, the stator and rotor rings are respectively provided with flux shifting teeth 31 and 32 which are arranged to be brought alternately into registry in alternate sectors of the two structures during relative rotation therebetween. More specifically, the teeth 32 of the rotor ring 26 are axially aligned with the teeth of the rotor ring 27, and the teeth are continued without interruption around the outer periphery of each rotor ring. The stator ring teeth, on the other hand, are offset with respect to each other as between the different sectors of the two structures. Thus by reference to Fig. 5 of the drawings, it will be noted that the tooth tips of the teeth 31 provided within the sector 35 of the stator ring 15 are advanced one tooth tip from the teeth 31 in the sector 34 of this ring. A similar tooth displacement is provided as between the teeth 31 in the sector 35 of the stator ring 15 and the teeth in the sector 36 of this ring. More generally, this same displacement is provided between the teeth included within successively adjacent sectors of the identified stator ring 15. This desired angular displacement between the teeth provided in the different sectors of the stator ring 15 may conveniently be obtained by leaving a full tooth opening, i. e. an opening comprising a tooth tip and a tooth slot, at the mouth of each of the coil slots 30a to 30f inclusive. As a result, and during relative rotation between the rotor and stator structures the teeth of the rotor ring 26 are alternately brought into registry with the teeth of the stator ring 15 in alternate sectors of the two structures, thereby to produce the desired flux shifting action in the manner fully described below. The teeth 31 provided in the other stator ring 16 are arranged in a manner identical with that just described with reference to the tooth arrangement of the stator ring 15. As shown in Fig. 4 of the drawings, the teeth 31 of the back stator ring 16 are arranged one tooth tip behind the teeth of the stator ring 15 in the direction of rotation of the rotor structure.

In considering the operation of the generator, it will be fully apparent from the above explanation that the function of the rotor and stator teeth is that of shifting the flux produced by the permanent magnet 22 back and forth between different sectors of the two structures during continuous rotation of the rotor structure in one direction. To analyze this flux valving action more carefully, it may first be assumed that the rotor structure is being driven at the particular speed necessary to produce the rated output frequency of the generator and that at a given instant the rotor and stator structures occupy the relative angular settings illustrated in Fig. 5 of the drawings. At this particular instant, the teeth 32 of the front rotor ring 26 register with the teeth 31 of the stator ring 15 only in the alternate sectors 34, 36 and 38 of the two structures. In the intervening sectors 35, 37 and 39, the teeth of the rotor ring 26 are completely out of registry with the teeth of the stator ring 15. Thus low reluctance flux paths are provided between the rotor ring 26 and the stator ring 15 within the sectors 34, 36 and 38, and relatively high reluctance flux paths are provided between these rings within the sectors 35, 37 and 39. As a result the predominant portion of the flux emanating from the north pole 24 of the permanent magnet 22 is caused to enter the stator ring 15 through the registering teeth in the sectors 34, 36 and 38 of the two structures. Only leakage flux enters the stator ring 15 from the rotor ring 26 in the intervening sectors 35, 37 and 39 where the teeth of these two rings are out of registry.

As indicated above, the teeth of the two stator rings 15 and 16 are displaced through an angle of one tooth tip relatively to each other so that when the teeth of the rings 15 and 26 are in registry within the sectors 34, 36 and 38, the teeth of the other two rings 16 and 27 are out of registry in these sectors and are in registry in the alternate sectors 35, 37 and 39. For purposes of explanation, therefore, the three portions of the flux entering the stator ring 15 through the sectors 34, 36 and 38 may be regarded as being subdivided into six smaller portions 40 to 45, inclusive. The portion 40 of the flux after entering the stator ring 15 within the sector 34 passes over the top of the active turn segments 33a and returns to the south pole 25 of the magnet 22 through the registering teeth of the back rings 16 and 27 which lie within the half segment 39b of the sector 39. In other words, and as will be evident from an inspection of Fig. 7 of the drawings, the flux lines 40 pass through the stator ring 15 upon one side of the active turn segments 33a and return to the rotor ring 27 through the stator ring 16 upon the opposite side of the active turn segments 33a. Similarly, the flux lines 41 after entering the stator ring 15 from the rotor ring 26 through the registered teeth within the segment 34b of the sector 34 pass over the top of the active turn segments 33b through the shell 12 and return to the rotor ring 27 through the registering teeth of the back rings 16 and 27 disposed within the segment 35a of the sector 35. In an entirely similar manner, the flux portions 42, 43, 44 and 45 enter the front stator ring 15 through the segments 36a, 36b, 38a and 38b of the rotor and stator structures, pass through the shell 12, and return to the back rotor ring 27 through the segments 35b, 37a, 37b and 39a of the two back rings 16 and 27.

As rotation of the rotor structure 11 relative to the stator structure 10 continues in a clockwise direction from the position shown in Fig. 5 of the drawings, the rotor teeth of the front ring 26 which fall within the sectors 34, 36 and 38 are moved out of registry with the teeth of the stator ring 15 within the same sectors, while coincidently the teeth of the ring 26 within the sectors 35, 37 and 39 are moved into registry with the teeth of the stator ring 15 in the same sectors. Concurrently with this operation, the teeth of the back rings 16 and 27 are moved out of registry within the sectors 35, 37 and 39 and are moved into registry within the sectors 34, 36 and 38. Such relative displacement of the rotor and stator teeth causes an increase in the reluctance between the rings 15 and 26 within the sectors 34, 36 and 38 accompanied by a decrease in the reluctance between these rings within the sectors 35, 37 and 39. As a result the entering flux is increasingly shifted out of the even numbered sectors of the rings 15 and 26 and into the odd numbered sectors of these rings. More specifically, the flux 40 is increasingly shifted out of the segment 34a into the segment 39b as the described relative movement between the rotor and stator structure proceeds. Concurrently therewith the entering flux portions 41, 42, 43, 44 and 45 are shifted out of the structure segments 34b, 36a, 36b, 38a and 38b into the segments 35a and 35b, 37a and 37b and 39a. The active turn segments of the winding 33 are thus all cut by different portions of the flux entering the stator structure incident to a single tooth tip angle of displacement between the rotor and stator structures. While the entering flux is thus being shifted to cut the active turn segments of the winding 33 in one direction the flux leaving the stator structure to return to the rotor structure is being correspondingly shifted to cut the active turn segments in the opposite direction. Thus as the teeth of the rings 16 and 27 are moved out of registry within the sectors 35, 37 and 39 and into registry within the sectors 34, 36 and 38 the return flux is increasingly shifted from the odd numbered sectors to the even numbered sectors in a manner which will be entirely evident from the above explanation. Incident to this shift, the different portions of the return flux cut different portions of the active turn segments of the winding. Stated otherwise, and in more general terms, all of the active turn segments of the winding 33 are twice cut by all but the leakage flux between the rotor and stator structures in response to each increment of rotation of the rotor structure through an angle defined by one tooth tip.

The purpose achieved in causing the entering and return flux lines to cut the active turn segments of the winding 33 in opposite directions is that of providing for additive combination of the induced voltage components thus generated in these segments of the winding by the two halves of the flux. Thus if the flux lines 40, for example, entering and leaving the stator structure were permitted to cut the turn segments 33a in the same direction the voltage components individually induced in these segments by the entering and leaving flux would necessarily be of opposed polarity anad would cancel each other. However, by causing the entering flux 40 to cut the turn segments 33a in one direction while at the same time causing the return flux 40 to cut the same turn segments in the opposite direction the induced voltage components are additively combined so that the total voltage developed in each turn segment is the sum of the two components. For the same reason, the stator entering and leaving fluxes are caused to cut the other five sets of active turn segments 33b, 33c, 33d and 33f in opposite directions.

By further reference to Fig. 7 of the drawings, it will be noted that the flux shifting action is produced in a manner such that the voltage components induced in the active turn segments 33 within any one of the six coil slots are additively combined with those developed in the active turn segments respectively disposed in the other five coil slots. Thus it will be noted that the turn segments 33a pass axially through the rotor structure in one direction, whereas the turn segments 33f and 33b disposed adjacent thereto upon opposite sides thereof pass through the stator structure in the opposite direction. If, therefore, the active turn segments 33a and 33b, for example, were respectively and concurrently cut in the same direction by the portions 40 and 41 the stator entering flux, cancelling voltage components of opposite polarity would be respectively developed in the turn segments 33a and 33b. With the described arrangement, however, the stator entering flux lines 40 and 41 are caused respectively to cut the active turn segments 33a and 33b concurrently in opposite directions whereby the voltage components concurrently induced in these turn segments are additively combined. For the same purpose, the return flux lines 40 and 41 are similarly caused respectively to cut the active turn segments 33a and 33b concurrently in opposite directions. This flux shifting or valving action, devised to provide for completely additive accumulation of the induced voltage components developed within the individual active turn segments of the winding, is similarly carried out in causing the other portions of the flux to cut the other active turn segments not specifically referred to.

From the foregoing explanation it will be apparent that with the described arrangement, the maximum distance any given line of flux is required to move is approximately 30 degrees. Moreover, this maximum movement takes place in only a small portion of the magnetic circuit. This condition is desirable for high frequency generators since it minimizes eddy current losses. To reduce the flux displacement angle still further, additional coil slots could be employed. For example, the use of eight coil slots would reduce the maximum flux displacement angle to 22.5 degrees. On the other hand, the use of four coil slots would increase the maximum flux displacement angle to 45 degrees. A minimum of two coil slots may be used, in which case the flux displacement is 90 degrees, and a single coil is employed. In all four cases, however, the active turn segments of the winding are twice cut by all of the flux during each tooth tip angle of displacement between the rotor and stator structures, so that the total induced E. M. F. is the same in all three cases. More generally stated, the magnitude of the winding terminal voltage developed is entirely independent of the number of coil slots employed, and is proportional to $2Nf\phi$, where $N$=No. of coil turns
$f$=output frequency
$\phi$=total flux less the leakage flux One of the principal advantages of the present improved device resides in the fact that high frequency alternating current may be generated at low rotor speeds. Thus, as the rotor structure 11 is driven at a selected speed, the flux produced by the permanent magnet 22 is shifted from the even numbered sectors of the two structures 10 and 11 to the odd numbered sectors or vice versa each time a point on the periphery of the rotor structure is rotated through an arc which equals the width of one rotor tooth. In other words, if the rotor is provided with N teeth, the predominant portion of the field flux produced by the magnet 22 will be shifted back and forth between the different sectors of the rotor and stator structures 2N times during each revolution of the rotor structure. It will also be understood that during alternate flux shifts voltage half cycles of positive polarity are developed across the output terminals 46 of the winding 33 and that during the intervening flux shifts voltage half cycles of negative polarity are produced across the terminals 46. Accordingly N cycles of alternating voltage are developed across the terminals 46 during each revolution of the rotor structure. Thus the frequency of the voltage produced by the generator is equal to a multiple of the rotor structure speed and the number of rotor teeth. In the illustrated arrangement the rotor rings 26 and 27 are each provided with 75 teeth which means that a rotor structure speed of 320 revolutions per minute is required to produce an output frequency of 400 cycles per second.

The wave form of the output voltage developed across the output terminals of the winding 33 is, of course, determined by the configuration of the tooth tips 31 and 32 and the configuration of the slots provided therebetween. By utilizing tooth and slot configurations of correct design, a voltage of true sinusoidal wave form may be produced across the terminals 46. In this regard it will be noted that the magnetic reluctance of the air paths separating the adjacent peripheries of the rings 15, 16, 26 and 27 remain constant at all angular positions of the rotor structure relative to the stator structure. Accordingly, the total flux entering and leaving the stator structure remains substantially constant during operation of the generator. In other words, the machine may be said to have a constant reluctance for all angular positions of the rotor structure. This condition is advantageous since it reduces eddy current losses in general, and is favorable for the maintenance of the necessary magnetomotive force in the permanent magnet 22. The condition of constant reluctance is also desirable in that it prevents distortion of the output voltage appearing across the terminals 46 of the winding 33.

In the arrangement described above the winding 33 is carried by the stator structure 10. This arrangement is open to the slight disadvantage that for a structure of given outer diameter the maximum possible rotor periphery where flux valve action takes place is not available. This disadvantage may be obviated by mounting the winding 33 upon the rotor structure in the manner indicated in Fig. 8 of the drawings and by employing a slip ring arrangement to bring out the winding terminals for connection to a load. As there shown, the winding 33' is provided with active turn segments which are wound in and out through coil slots 47 evenly spaced around the outer peripheries of the rotor rings 26 and 27. The teeth 31 of the two stator rings 15 and 16 are evenly spaced around these rings, are uninterrupted and are aligned axially of the rotor and stator structures. The teeth 32 respectively provided at the outer peripheries of the two rotor rings 26 and 27 are, on the other hand, angularly displaced from each other in the successively adjacent sectors of the rotor structure by an angle defined by one tooth tip, and the teeth of one ring are offset by an angle of one tooth tip relative to the teeth of the other ring, all in a manner which will be clearly apparent from the preceding explanation. On this point it will be understood that the active turn segments of the coil 33', i. e. those segments which extend through the rotor rings 26 and 27 in directions parallel to the axis of rotation of the rotor, are disposed at the dividing points between the various sectors of the two structures. The manner in which the flux valving action is produced in a fully developed embodiment of the Fig. 8 arrangement to induce additive voltage components in the active turn segments of the winding 33' is exactly similar to that described above with reference to the structures shown in Figs. 1 through 7 of the drawings, and will be clearly apparent from this description.

Inherently the present improved generator is characterized by a relatively large leakage reactance. This reactance as seen from the output terminals 46 of the winding 33 manifests itself as a relatively large inductive reactance connected in series with the load across the output terminals, such that the voltage drop thereacross varies substantially with changes in the load current. In order to neutralize this reactance, thereby to improve the no-load to full-load voltage regulation of the generator, a capacitance network consisting of series and shunt capacitance elements of appropriate value determined by the frequency at which the device is set to operate, may be connected in circuit with the load across the output terminals 46 of the winding 33. In such case, appropriate selection of the series and shunt capacitance values may be used to obtain the desired voltage regulation characteristic.

Figures 8, 9, 10:
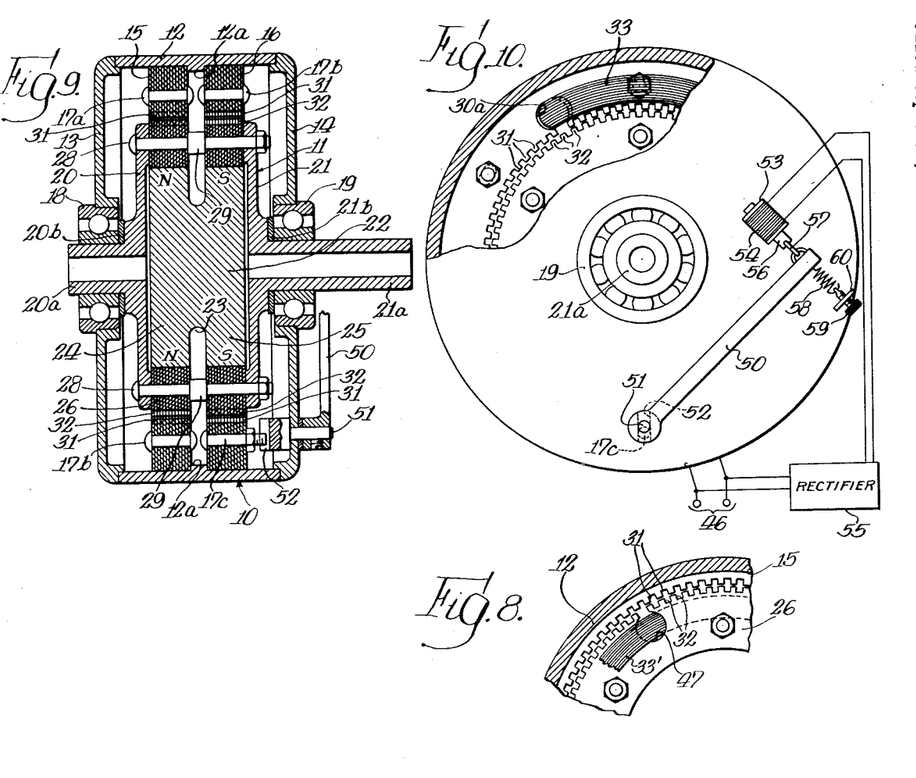
Fig. 8 is a fragmentary front view of a modified generator arrangement wherein the inductor winding is carried by the rotor structure of the generator.
Fig. 9 is a side sectional view illustrating a modified structural arrangement of the generator.
Fig. 10 is a rear view of the generator shown in Fig. 8.

Automatic voltage regulation may also be obtained by utilizing the improved electro mechanical voltage regulating facilities illustrated in Figs. 9 and 10 of the drawings. In general, this embodiment of the invention is fundamentally similar to that illustrated in Figs. 1 through 7 of the drawings. Accordingly, like reference characters have been used to identify corresponding parts of the two structures. In the arrangement of Figs. 9 and 10, however, facilities are provided for automatically changing the angular position of the stator ring 16 relative to the stator ring 15 to so alter the phase relationship between the voltage components produced in the active turn segments of the winding 33 by the stator entering and leaving fluxes, respectively, as to maintain substantially constant the voltage appearing across the output terminals 46 of this winding. These facilities include an actuating arm 50 which is set screw mounted upon a cam pin 51 journaled in an opening through the housing plate 14. At its inner enlarged end, the pin 51 is provided with a transverse cam slot 52 which is utilized in moving the stator ring 16 to different angular settings relative to the stator ring 50. More specifically, the stator ring 15 is staked or otherwise positively locked against rotation within the shell 12. The rotor ring 16 on the other hand is arranged for limited rotary movement relative to the shell 12. In this regard it is noted that separate clamping rivets 17a and 17b are utilized to maintain the laminations of the two rings 15 and 16 assembled, whereby relative rotary movement between the two rings is permitted. Further to this end, the coil slots 30 through which the active turn segments of the winding 33 respectively extend are elongated slightly along their circumferential diameters to permit slight relative movement of the ring 16 relative to the active turn segments of the winding 33. The inactive segments of this winding, which alternately appear upon the front and back sides of the two rings 15 and 16, may be relied upon to maintain these rings in engagement with the centrally disposed rib 12a of the shell 12 to prevent relative axial movement therebetween. At a point adjacent the enlarged inner head of the cam pin 51, the rotor ring 16 carries a bolt 17c having an end portion which projects within the cam slot 52. The axis of this bolt is offset slightly with respect to the axis of the pivot pin 51 so that angular movement of the rotor ring 16 relative to the shell 12 and the ring 15 is produced in response to pivotal movement of the arm 50.

For the purpose of variably moving the arm 50 to minimize changes in the magnitude of the voltage appearing across the output terminals 46, a voltage responsive solenoid 53 is provided having a winding 54 connected through a full wave rectifier 55 for energization by the voltage appearing across the terminals 46. This solenoid includes an armature 56 movable within the winding 54 and connected to one side of the free end of the arm 50 through a universal link 57. A coil spring 58 tensioned between the opposite side of the arm 50 and the end of an adjusting screw 59 threaded into a bracket 60 extending outwardly from the housing wall 14, is provided for determining the setting of the arm 50 and hence the relative angular positions of the two rings 15 and 16 under a given generator load condition.

As will be evident from the above explanation, the setting of the arm 50 is determined by equality of the forces exerted upon opposite sides of the free end of this arm by the spring 58 and the solenoid 53. To obtain the desired regulation, the screw 59 is so adjusted that under a fully loaded condition of the generator, equalized forces are imposed upon the free end of the arm 50 when the teeth 31 of the stator ring 16 are angularly displaced from the teeth of the stator ring 15 by an angle defined by one tooth tip, i. e. 2.4 degrees for the described generator employing 75 rotor teeth. With this adjustment established, the generator is set to deliver its full rated voltage when fully loaded. As the load decreases the voltage drop occasioned by the leakage reactance of the generator tends to correspondingly decrease to produce a corresponding increase in the voltage across the output terminals 46. A small increase in this voltage drop produces a corresponding increase in the output voltage of the rectifier 55 to correspondingly increase the pull exerted upon the armature 56 of the solenoid 53. As a result, the arm 50 is pivoted in a counterclockwise direction as viewed in Fig. 10 of the drawings. In response to the resulting pivotal movement of the pivot pin 51 to actuate the bolt 17c, the rotor ring 16 is rotated in a direction to rotate the stator ring 16 toward a position wherein the teeth thereof are more nearly aligned with the teeth of the ring 15. Electrically, this action destroys the previously described in phase relationship between the voltage components induced in the active turn segments of the winding 33 by the flux entering the stator structure and the flux leaving the stator structure. Since these voltage components combine vectorially within the winding 33, the end result of the angular displacement between the two stator rings 15 and 16 is a reduction in the output voltage across the terminals 46. The reverse action obviously occurs as the load imposed upon the generator increases. It will be apparent that the extent of such angular displacement is determined by the extent of the voltage increase or decrease across the terminals 46. Since, however, movement of the startor ring 16 through an angle defined by one rotor tooth tip will produce a 180 degree phase displacement between the induced voltages developed by the stator entering and leaving fluxes, it will be evident that the described voltage regulating facilities are extremely sensitive to small changes in the voltage appearing at the terminals of the winding 33. Accordingly, excellent no-load to full-load voltage regulation may be obtained through the action of this improved voltage regulating arrangement.

As will appear from the preceding explanation, the present improved generator is of rugged trouble free construction capable of producing with high efficiency an output voltage of high frequency at a low rotor speed. Further, the single magnet provided at the center of the rotor structure will retain its magnetomotive force much better than the plurality of small magnets conventionally employed in multipolar machines. These advantages make the described generator particularly well adapted for military purposes when hand operation of the device may be required.

While there has been described what is at present considered to be the preferred embodiment of the invention, it will be understood that various modifications may be made therein which are within the true spirit and scope of the invention as defined in the appended claims.

I claim:

1. An alternating current generator comprising relatively rotatable toothed rotor and stator structures divided into sectors, each sector comprising substantially more teeth than the number of sectors in said structure, means for producing flux traversal of said structures, said structures including means for causing the predominant portion of the flux linking said structures to shift back and forth between different sectors of said structures, and a winding carried by one of said structures and including active turn segments disposed between at least two of said sectors to be twice cut by a portion of the flux during each shift of the flux between different sectors of said structures, adjacent active turn segments of said winding defining a sector therebetween.

2. An alternating current generator comprising relatively rotatable toothed rotor and stator structures divided into sectors, each sector comprising substantially more teeth than the number of sectors in said structure, means for producing flux traversal of said structures, said structures including flux shifting means for causing all but the leakage flux linking said structures to shift back and forth between different sectors of said structures during relative rotation therebetween, and a winding carried by one of said structures and including active turn segments extending substantially parallel to the axis of relative rotation of said structures at points between said sectors to be cut by different portions of the flux as the flux is shifted between different sectors of said structures, adjacent active turn segments of said winding defining a sector therebetween.

3. An alternating current generator comprising relatively rotatable toothed rotor and stator structures divided into sectors, means for producing flux traversal of said structures, said structures including flux shifting teeth arranged to be alternately brought into registry in alternate ones of said sectors during relative rotation of said structures, thereby to cause all but the leakage flux linking said structures to shift back and forth between different sectors of said structures, the number of teeth in each sector being substantially greater than the number of sectors in said structure, and a winding carried by one of said structures and including active turn segments disposed between said sectors and extending substantially parallel to the axis of relative rotation between said structures to be cut by different portions of the flux each time the flux is shifted between different sectors of said structures.

4. An alternating current generator comprising relatively rotatable rotor and stator structures divided into sectors, means for producing flux traversal of said structures, said structures including flux shifting teeth arranged to be alternately brought into registry in alternate sectors during relative rotation of said structures, thereby to shift different portions of the flux back and forth between adjacent sectors of said structures, said teeth being divided into two displaced sets such that the flux enters one of said structures through one tooth set and leaves said one structure through the other tooth set, the number of teeth in each sector being substantially greater than the number of sectors in said structure, and a winding carried by one of said structures and including active turn segments disposed between said sectors to be concurrently cut by both the entering and leaving flux each time the flux is shifted between adjacent sectors of said structures, and the teeth of one of said structures being angularly so displaced that the entering flux cuts said active turn segments in one direction and the leaving flux cuts said active turn segments in the opposite direction.

5. In an alternating current generator, relatively rotatable rotor and stator structures divided into sectors, means for producing flux traversal of said structures, said structures including flux shifting teeth arranged to be alternately brought into registry in alternate sectors of said structures during relative rotation of said structures, thereby to shift different portions of the flux back and forth between adjacent sectors of said structures, the number of teeth in each sector being substantially greater than the number of sectors in said structure, said teeth being divided into two sets such that the flux enters one of said structures through one set of teeth and leaves said one structure through the other set of teeth, and the teeth of one of said structures being angularly so displaced that the entering and leaving flux are concurrently shifted between said sectors in opposite directions.

6. An alternating current generator comprising relatively rotatable rotor and stator structures divided into sectors, means for producing flux traversal of said structures, said structures including flux shifting teeth arranged to be alternately brought into registry in alternate sectors of said structures in response to each tooth tip angle of relative rotation of said structures, thereby to shift different portions of the flux back and forth between adjacent sectors of said structures at a rate of one shift for each tooth tip angle of relative rotation of said structures, said teeth being divided into two sets such that the flux enters one of said structures through one set of teeth and leaves said one structure through the other set of teeth, and the teeth of one of said structures being angularly so displaced that the entering and leaving flux are concurrently shifted between said sectors in opposite directions, the number of teeth in each sector being substantially greater than the number of sectors in said structure, and a winding carried by one of said structures and including active turn segments disposed between said sectors, whereby additive voltage components are induced in said active turn segments by the shifting of said entering and leaving flux between said sectors.

7. An alternating current generator comprising a rotor structure provided with two groups of axially spaced and peripherally disposed teeth, a stator structure including two groups of teeth radially aligned with the rotor structure teeth and separated from said rotor structure teeth by an air gap, means for magnetizing said structures so that the two sets of rotor structure teeth are oppositely poled, whereby the flux enters said stator structure, through one group of stator teeth and leaves said stator structure through the other group of stator teeth, and a winding carried by said stator structure and including active turn segments dividing said stator structure into sectors, each active turn segment disposed to be cut by both the entering and leaving flux during rotation of said rotor structure, one group of teeth of one of said structures being so displaced angularly relative to the other group of teeth of the same structure that additive induced voltages are developed in said active turn segments by said entering and leaving flux, the number of teeth in each sector being substantially greater than the number of sectors in said stator structure.

8. An alternating current generator comprising a rotor structure provided with centrally disposed magnet means having axially spaced annular poles of opposite polarity at the periphery thereof, spaced rotor rings respectively surrounding said annular poles, a stator structure comprising a pair of spaced apart stator rings arranged in radial alignment with said rotor rings and having their inner peripheries separated from the outer peripheries of said rotor rings by air gaps, whereby the flux enters said stator structure through one radially aligned set of rotor and stator rings and leaves said stator structure through the other radially aligned set of rotor and stator rings, a winding carried by one of said structures and provided with spaced apart active turn segments dividing said structures into sectors and extending through the rings of said one structure in directions parallel to the axis of rotation of said rotor structure, and flux shifting means in the form of teeth provided at the adjacent peripheries of said rotor and stator structures for so shifting the flux back and forth between said sectors that additive voltage components are developed in said active turn segments by said entering and leaving flux, the number of teeth in each sector being substantially greater than the number of sectors in said structures.

9. An alternating current generator comprising a rotor structure provided with centrally disposed magnet means having axially spaced annular poles of opposite polarity at the periphery thereof, spaced rotor rings respectively surrounding said annular poles, a stator structure comprising a pair of spaced apart stator rings arranged in radial alignment with said rotor rings and having their inner peripheries separated from the outer peripheries of said rotor rings by air gaps, whereby the flux enters said stator structure through one radially aligned set of rotor and stator rings and leaves said stator structure through the other radially aligned set of rotor and stator rings, a winding carried by said stator ring and provided with spaced apart active turn segments dividing said structures into sectors and extending through said stator rings in directions parallel to the axis of rotation of said rotor structure, and teeth provided at the adjacent peripheries of said rotor and stator structures for so shifting the flux back and forth between said sectors that additive voltage components are developed in said active turn segments by said entering and leaving flux, the number of teeth in each sector being substantially greater than the number of sectors in said structures.

10. An alternating current generator comprising a rotor structure provided with centrally disposed magnet means having axially spaced annular poles of opposite polarity at the periphery thereof, spaced rotor rings respectively surrounding said annular poles, a stator structure comprising a pair of spaced apart stator rings arranged in radial alignment with said rotor rings and having their inner peripheries separated from the outer peripheries of said rotor rings by air gaps, whereby the flux leaves said rotor structure through one radially aligned set of rotor and stator rings and enters said rotor structure through the other set of radially aligned rotor and stator rings, a winding carried by said rotor rings and provided with spaced apart active turn segments dividing said structures into sectors and extending through said rotor rings in directions parallel to the axis of rotation of said rotor structure, and teeth provided at the adjacent peripheries of said rotor and stator structures for so shifting the flux back and forth between said sectors that additive voltage components are developed in said active turn segments by said entering and leaving flux.

11. An alternating current generator comprising relatively rotatable rotor and stator structures at least one of which includes two axially displaced relatively movable parts, means for producing flux traversal of said structures, said structures being of such configuration that the flux enters and leaves each of said structures over different paths, a winding including active turn segments arranged to be cut by the flux entering and leaving one of said structures, whereby separate voltage components are induced in said segments by the entering and leaving flux, and means for moving at least one of said two movable parts of said one structure relative to the other, thereby to change the phase relationship between said voltage components.

12. An alternating current generator comprising relatively rotatable rotor and stator structures having adjacent peripheries and one of which includes two relatively movable parts, means for producing flux traversal of said structures, said structures being of such configuration that the flux enters and leaves each of said structures over axially spaced annular paths, a winding carried by one of said structures and provided with active turn segments disposed to be cut by the flux traversing both of said paths, means provided at the adjacent peripheries of said structures for causing the flux traversing said paths to cut said active turn segments in opposite directions, whereby different components of voltage are induced in said segments by the flux respectively traversing said paths, and means for moving said two movable parts of said one structure relative to each other, thereby to change the phase relationship between said different voltage components.

13. An alternating current generator comprising a rotor structure provided with centrally disposed magnet means having axially spaced annular poles of opposite polarity at the periphery thereof, spaced rotor rings respectively surrounding said annular poles, a stator structure comprising a pair of spaced apart stator rings arranged in radial alignment with said rotor rings and having their inner peripheries separated from the outer peripheries of said rotor rings, whereby the flux leaves said rotor structure through one radially aligned set of rotor and stator rings and enters said rotor structure through the other set of radially aligned rotor and stator rings, the rings of one of said two structures being angularly adjustable relative to each other, a winding carried by one of said two structures and provided with spaced apart active turn segments dividing said structures into sectors and extending through the rings of said one structure in directions parallel to the axis of rotation of said rotor structure, teeth provided at the adjacent peripheries of said rotor and stator structures for so shifting the flux back and forth between said sectors that different voltage components are developed in said active turn segments by said entering and leaving flux, and means for changing the angular relationship between said angularly adjustable rings, thereby to change the phase relationship between said different voltage components.

14. An alternating current generator comprising a rotor structure provided with centrally disposed magnet means having axially spaced annular poles of opposite polarity at the periphery thereof, spaced rotor rings respectively surrounding said annular poles, a stator structure comprising a pair of spaced apart stator rings arranged in radial alignment with said rotor rings and having their inner peripheries separated from the outer peripheries of said rotor rings, whereby the flux leaves said rotor structure through one radially aligned set of rotor and stator rings and enters said rotor structure through the other set of radially aligned rotor and stator rings, said stator rings being angularly adjustable relative to each other, a winding carried by said stator and provided with spaced apart active turn segments dividing said structures into sectors and extending through said stator rings in directions parallel to the axis of rotation of said rotor structure, teeth provided at the adjacent peripheries of said rotor and stator structures for so shifting the flux back and forth between said sectors that different voltage components are developed in said active turn segments by said entering and return flux, and means for changing the angular relationship between said stator rings, thereby to change the phase relationship between said different voltage components.

15. An alternating current generator comprising relatively rotatable rotor and stator structures at least one of which includes two relatively movable parts, means for producing flux traversal of said structures, said structures being of such configuration that the flux enters and leaves each of said structures over different paths, a winding including active turn segments arranged to be cut by the flux entering and leaving one of said structures, whereby separate voltage components are induced in said segments by the entering and leaving flux, and means controlled in accordance with the magnitude of the voltage developed across the terminals of said winding for moving said two movable parts of said one structure relative to each other to thus change the phase relationship between said voltage components in the correct sense to minimize variations in the voltage developed across said terminals.

16. An alternating current generator comprising a rotor structure provided with centrally disposed magnet means having axially spaced annular poles of opposite polarity at the periphery thereof, spaced rotor rings respectively surrounding said annular poles, a stator structure comprising a pair of spaced apart stator rings arranged in radial alignment with said rotor rings and having their inner peripheries separated from the outer peripheries of said rotor rings, whereby the flux leaves said rotor structure through one radially aligned set of rotor and stator rings and returns to said rotor structure through the other set of radially aligned rotor and stator rings, said stator rings being angularly adjustable relative to each other, a winding carried by said stator structure and provided with spaced apart active turn segments dividing said structures into sectors and extending through said stator rings in directions parallel to the axis of rotation of said rotor structure, teeth provided at the adjacent peripheries of said rotor and stator structures for so shifting the flux back and forth between said sectors that different voltage components are developed in said active turn segments by said entering and return flux, and means controlled in accordance with the magnitude of the voltage developed across the terminals of said winding for changing the angular relationship between said stator rings to thus change the phase relationship between said voltage components in the correct sense to minimize variations in the voltage developed across said terminals.

17. An alternating current generator comprising relatively rotatable rotor and stator structures, means for producing flux traversal of said structures, said structures being of such configuration that the flux enters and leaves each of said structures over different paths, a continuous winding including active turn segments disposed in spaced parallel relationship around one of said structures arranged to be cut by the flux entering and leaving one of said structures, whereby different voltage components are developed in said winding segments by the entering and leaving flux, and means controlled in accordance with the magnitude of the voltage developed across the terminals of said winding for changing the phase relationship between said voltage components in the correct sense to minimize variations in the voltage developed across said terminals.

EDWARD H. YONKERS.

REFERENCES CITED

The following references are of record in the file of this patent:

UNITED STATES PATENTS

| Number | Name | Date |
| --- | --- | --- |
| 324,666 | Diehl | Aug. 18, 1885 |
| 529,918 | Kelly | Nov. 27, 1894 |
| 1,157,414 | Neuland | Oct. 19, 1915 |
| 1,160,087 | Neuland | Nov. 9, 1915 |
| 1,211,617 | Neuland | Jan. 9, 1917 |
| 2,071,953 | Schou | Feb. 23, 1937 |
| 2,108,662 | Fisher | Feb. 15, 1938 |
| 2,146,588 | Merrill | Feb. 7, 1939 |

FOREIGN PATENTS

| Number | Country | Date |
| --- | --- | --- |
| 434,055 | Germany | Sept. 20, 1926 |
| 286,792 | Italy (Siemens) | Jan. 30, 1930 |